No. 864,816. PATENTED SEPT. 3, 1907.
W. R. WARREN.
ROTARY KILN.
APPLICATION FILED FEB. 6, 1906.
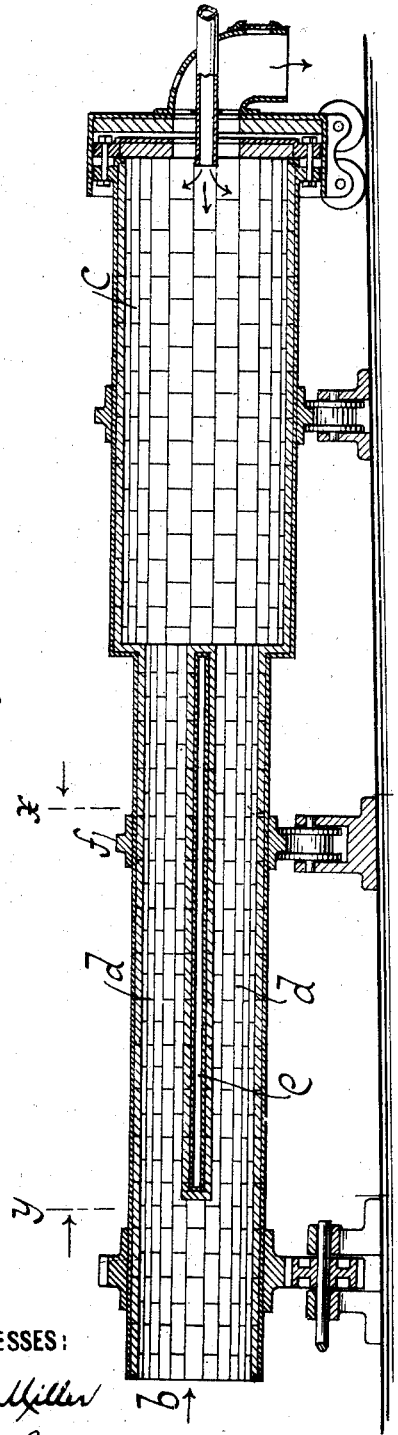
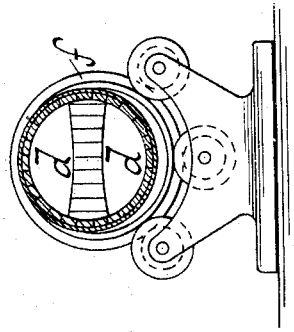
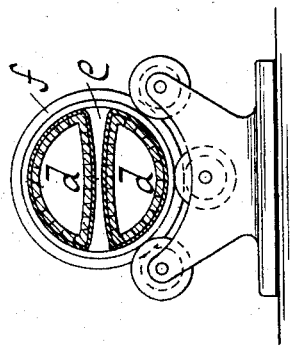
WITNESSES:
William M. Miller
Edward Kiernan
INVENTOR
William R. Warren
BY
W. C. Hauff
ATTORNEY

UNITED STATES PATENT OFFICE.

WILLIAM R. WARREN, OF NEW YORK, N. Y.

ROTARY KILN.

No. 864,816.  Specification of Letters Patent.  Patented Sept. 3, 1907.

Application filed February 6, 1906. Serial No. 299,772.

*To all whom it may concern:*

Be it known that I, WILLIAM R. WARREN, a citizen of the United States, residing at Manhattan borough, in the county of New York and State of New York, have invented new and useful Improvements in Rotary Kilns, of which the following is a specification.

This invention relates to a rotary kiln divided into compartments with a space or spaces therebetween. Such space allows cooling thus adding to the life of the kiln and greater ease is possible in building or in constructing a partition against a shell.

The device can be used for burning cement or like operations.

This invention is set forth in the following specification and claim and illustrated in the annexed drawing, in which:

Figure 1 is a sectional side elevation of a rotary kiln embodying this invention. Fig. 2 is a section along $xx$ Fig. 1. Fig. 3 is a section along $yy$ Fig. 1.

In this drawing is shown a rotary kiln for the manufacture of burning of cement or the like. The material to be burned or treated is fed in at the portion or intake $b$ which may be of any suitable shape, cylindrical or otherwise and in one or more compartments. The outlet is located at part $c$ of the kiln.

The part $d$ is two or more compartments, being formed of shells with a space or spaces $e$ between them. These are bound together by strong bands $f$ the usual steel tires being used also to rotate them on the trunnions.

The advantages of this invention lie in the cooling space $e$ thus adding to life of kiln and the greater ease possible in building the partition against a steel shell. In this plan ordinary blocks, such as are used in making present kiln linings, can be used for this purpose. Also the subdivision by steel shell greatly strengthens the whole and prevents any distortion that might take place by reason of an unsupported partition. The subdivision of the outer shell also exposes a larger extension cooling surface. The cooling space $e$ allows the circulation of any suitable cooling medium for example water, air or other blast or substance.

In the forms of kilns heretofore described, an actual flame passes from the common chamber simultaneously to the sub-divisions in contra-distinction to the divided kiln wherein hot air or gases circulate, or in which actual flames do not enter the sub-divisions. By having the actual flame pass into the sub-divisions from the common chamber as in the present invention, a material advantage results in effective heating of the kiln and expedition in operation desired to be pursued therein.

The space $e$ is defined by upper and lower walls $e'$ extending transversely across the part $d$ and centrally projected towards each other in curved planes, or, in other words, having opposed concavo-convex cross sectional contours. The space $e$ communicates with the exterior of the part $d$ or of the kiln, and said space flares at its opposite extremities so as to be practicable for the inlet and circulation therethrough of the cooling medium, which may be air, water, or other substance, there being no communication whatever between the space $e$ and the interior of the part $d$.

What I claim as my invention and desire to secure by Letters Patent, is:

1. A rotary kiln having a common chamber, and sub-divisions providing compartments communicating with said common chamber, and a fuel intake for generating the flame, the flame passing from the common chamber simultaneously into the several compartments, a portion of the kiln having a space extending transversely therethrough and communicating with the exterior of the kiln at diametrically opposite points, the space being without communication with the interior of the kiln.

2. A rotary kiln comprising a plurality of compartments formed by a sub-division in the body of the kiln and communicating with a common chamber, the sub-division being hollow and having a space communicating with the exterior of the kiln at diametrically opposite points, the space diverging at opposite extremities, and means for feeding fuel to the common chamber.

In testimony whereof I have hereunto set my hand in the presence of two subscribing witnesses.

WILLIAM R. WARREN.

Witnesses:
 GEORGE HULSBERG,
 EDWARD WIESNER.